US011138590B2

(12) United States Patent
Dhingra

(10) Patent No.: US 11,138,590 B2
(45) Date of Patent: Oct. 5, 2021

(54) APPARATUS AND METHOD FOR EMBEDDING DIGITAL CERTIFICATIONS WITHIN DOCUMENTS

(71) Applicant: Titan Seal, Inc., San Francisco, CA (US)

(72) Inventor: Philip Dhingra, Austin, TX (US)

(73) Assignee: Titan Seal, Inc., San Francisco, CA (US)

( * ) Notice: Subject to any disclaimer, the term of this patent is extended or adjusted under 35 U.S.C. 154(b) by 232 days.

(21) Appl. No.: 16/210,438

(22) Filed: Dec. 5, 2018

(65) Prior Publication Data

US 2020/0219088 A1    Jul. 9, 2020

Related U.S. Application Data

(60) Provisional application No. 62/597,323, filed on Dec. 11, 2017.

(51) Int. Cl.
| | |
|---|---|
| *G06Q 20/36* | (2012.01) |
| *G06F 16/18* | (2019.01) |
| *G06F 21/64* | (2013.01) |
| *H04L 9/06* | (2006.01) |
| *H04L 29/06* | (2006.01) |

(52) U.S. Cl.
CPC ......... *G06Q 20/36* (2013.01); *G06F 16/1805* (2019.01); *G06F 21/64* (2013.01); *H04L 9/0643* (2013.01); *H04L 63/0823* (2013.01); *H04L 2209/38* (2013.01)

(58) Field of Classification Search
USPC ..................................... 705/50–79
See application file for complete search history.

(56) References Cited

U.S. PATENT DOCUMENTS

| | | | |
|---|---|---|---|
| 6,938,157 | B2 | 8/2005 | Kaplan |
| 7,676,501 | B2 | 3/2010 | Wilson |
| 7,904,450 | B2 | 3/2011 | Wilson |
| 9,760,697 | B1 * | 9/2017 | Walker ................. G06F 21/645 |
| 2003/0145206 | A1 | 7/2003 | Wolosewicz et al. |

(Continued)

FOREIGN PATENT DOCUMENTS

| | | |
|---|---|---|
| AU | 2018100149 A4 | 3/2018 |
| CA | 3012870 A1 | 8/2017 |

(Continued)

OTHER PUBLICATIONS

Mastering Bitcoin (Antonopoulos, Published by O'Reilly Media, Inc. (Year: 2014).*

(Continued)

*Primary Examiner* — James D Nigh
*Assistant Examiner* — Margaret M Neubig
(74) *Attorney, Agent, or Firm* — Cooley LLP

(57) ABSTRACT

A machine has a network interface circuit to provide connectivity to a network. The machine also has a processor and a bus connecting the processor and the network interface circuit. A memory is connected to the bus. The memory stores instructions executed by the processor to form a wallet for a message sending client, open a placeholder container for a future cryptographic transaction to be recorded in the wallet, and form a network link to the placeholder container.

1 Claim, 5 Drawing Sheets

(56) References Cited

U.S. PATENT DOCUMENTS

| | | | | |
|---|---|---|---|---|
| 2016/0071074 A1* | 3/2016 | Baird | .................... | G06Q 20/367 |
| | | | | 705/40 |
| 2016/0350728 A1* | 12/2016 | Melika | ................ | G06Q 20/3829 |
| 2017/0005804 A1* | 1/2017 | Zinder | ................. | G06F 21/6254 |
| 2017/0091802 A1* | 3/2017 | Li | ........................ | H04M 17/106 |
| 2017/0302450 A1 | 10/2017 | Ebrahimi | | |
| 2017/0329996 A1 | 11/2017 | Wilson | | |
| 2018/0183606 A1* | 6/2018 | High | ..................... | H04L 9/3239 |

FOREIGN PATENT DOCUMENTS

| | | | | |
|---|---|---|---|---|
| KR | 20160150278 A | | 12/2016 | |
| WO | WO-2009067806 A1 * | | 6/2009 | ............. G06Q 50/18 |
| WO | WO-2017-136879 A1 | | 8/2017 | |
| WO | WO-2017-146333 A1 | | 8/2017 | |

OTHER PUBLICATIONS

Extended European Search Report dated Feb. 15, 2019 for EP Application No. 18211623.6, 9 pages.

* cited by examiner

APPARATUS AND METHOD FOR EMBEDDING DIGITAL CERTIFICATIONS WITHIN DOCUMENTS

CROSS-REFERENCE TO RELATED APPLICATION

This application claims priority to U.S. Provisional Patent Application Ser. No. 62/597,323, filed Dec. 11, 2017, the contents of which are incorporated herein by reference.

FIELD OF THE INVENTION

This application relates generally to communications in computer networks. More particularly, this invention relates to techniques for embedding digital certifications within documents.

BACKGROUND OF THE INVENTION

Between the production and distribution of a digital document, there needs to be a way to ensure (or certify) that the document has not been altered. The standard solution is to generate a unique, mathematically deterministic fingerprint for the document, called a hash. If even a single bit of the document changes, the hash will be different and no longer match the original document's hash. The recipient of the document can then compare the hash to the document and determine that the document has not been altered.

The standard solution technically solves the problem but is not user-friendly enough to be practical for the most common uses of certified documents. Typically, the first recipient intends to pass the certified document to a second recipient, such as a government agency. For example, a marriage officiant produces a document certifying that a party is married. The officiant then passes the marriage license to the marrying party, who then presents it to the Department of Motor Vehicles (DMV) to change a name on a driver's license.

Currently, this process is paper-based, which is slow, but the standard digital solution is impractical as well. The standard digital solution requires sending recipients two pieces of information: the hash and the document. Keeping track of two pieces of information is more cumbersome for storage and retrieval than a single piece of information. In addition, the final recipient, which in this example is the agent at the DMV, is typically unwilling to accept that the certifying information is separate from the original document. The agent is typically only comfortable with embossed or wet seals affixed to the certified document.

It is known to provide a document, typically in a PDF format, to an entity and in return, the entity supplies a PDF certificate that has a hash of the original document. Furthermore, the hash is stored in two blockchains, say Ethereum® and Bitcoin®, which are unalterable distributed public ledgers. The benefit of using blockchain is that it ensures that the hash of the document has not been altered along with the document. This solution results in two documents, the hash and the original, which as mentioned above, is problematic from a usability perspective.

Ideally, the hash and the document would be combined into a single document. However, the simplest solution is a mathematical impossibility. If one includes the hash of a document in the original document, the original hash is no longer valid. One would then have to change the included hash, which would change the hash of the whole document, which would require one to change the hash again, and again, so that one would never meet the requirements of the hash of a document referring to itself.

Adobe® created a single-document solution through a standard called X.509. In this document format, the hash is included within the header of the document, and is meant to only certify the body of the document, as opposed to the whole document. Furthermore, the hash is cryptographically signed with the certifying party's private key. This way, if the document, and the subsequent hash, are altered, the signed hash will no longer correspond to the public key of the certifier.

The problem with this solution is that this certifying information is only viewable in a proprietary product (i.e., Adobe Reader®), which is not pervasively installed. The most popular PDF readers are built into operating systems or browsers. Apple iOS® and Microsoft Windows® are the two most popular desktop operating systems and both of their default PDF readers do not show the certifying information of the X.509 standard. Google Chrome® is the most popular web browser, and its built-in PDF reader also does not display the certifying information.

Furthermore, if Adobe Reader® is installed, the presentation of the certifying information is controlled by the design of Adobe Reader®, which displays the information as a narrow bar at the top of a document. For a final recipient of a document, this bar is insufficient compared to the imprimatur of authenticity conferred by an embossed or wet seal. Unless the sender can control the recipient's environment, then they cannot be sure that the Adobe® solution will be readily accepted, despite technically meeting the requirements for digital document certification.

In view of the foregoing, there is a need to embed digital certifications within documents.

SUMMARY OF THE INVENTION

A machine has a network interface circuit to provide connectivity to a network. The machine also has a processor and a bus connecting the processor and the network interface circuit. A memory is connected to the bus. The memory stores instructions executed by the processor to form a wallet for a message sending client, open a placeholder container for a future cryptographic transaction to be recorded in the wallet, and form a network link to the placeholder container.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
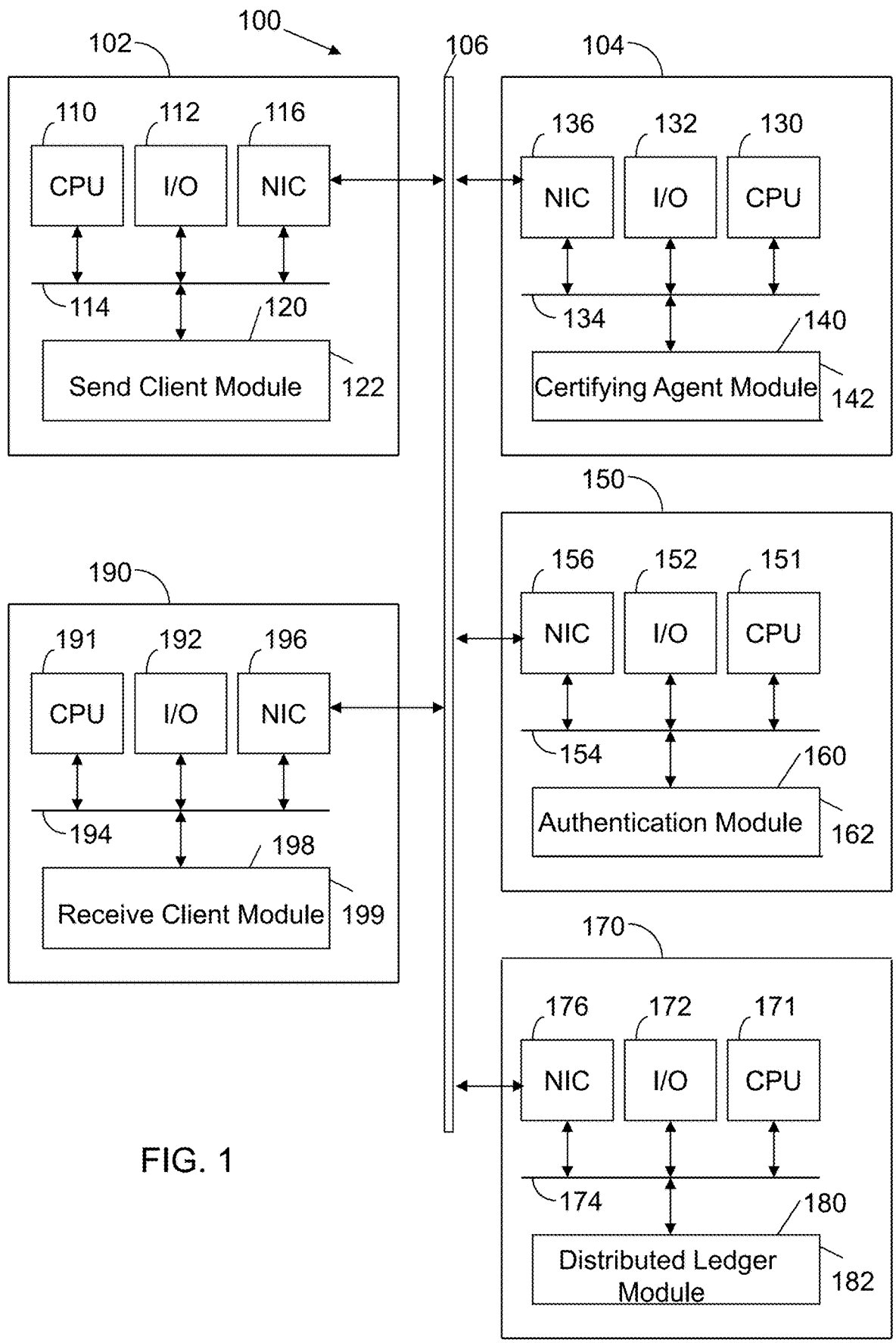
FIG. 1 illustrates a system configured in accordance with an embodiment of the invention.

FIG. 1 illustrates a system 100 configured in accordance with an embodiment of the invention. The system 100 includes a message sending client machine 102 connected to a certifying agent machine 104 via a network 106, which may be any combination of wired and wireless networks. The message sending client machine 102 may be a computer, tablet, smartphone and the like. The machine 102 includes a processor (e.g., central processing unit 110) connected to input/output devices 112 via a bus 114. The input/output devices 112 may include a keyboard, mouse, touch display and the like. A network interface circuit 116 is also connected to the bus 114 to provide connectivity to network 106. A memory 120 is also connected to the bus 114. The memory stores a message sending client module 122 with instructions executed by the processor 110. As detailed below, module 122 coordinates the formation of a wallet, uses the wallet to request authentication of a document and distributes an authenticated document.

The distributed ledger is a collection of nodes on network 106 operating in a peer-to-peer network where each node replicates and saves an identical copy of the ledger. The distributed ledger is a consensus of replicated, shared and synchronized digital data distributed across the collection of nodes. The "wallet" is a digital wallet, which is an online service that allows an individual to make electronic transactions. More particularly, the wallet facilitates recording transactions within the distributed ledger.

The certifying agent machine 104 includes a processor 130, input/output devices 132, a bus 134 and a network interface circuit 136. A memory 140 is connected to the bus 134. The memory 140 stores a certifying agent module 142, which includes instructions executed by processor 130 to implement operations disclosed herein. The module 142 forms a wallet for a message sending client. The module 142 opens a placeholder container for a future cryptographic transaction to be recorded in the wallet and forms a link to the placeholder container.

An authentication machine 150 is also connected to network 106. By way of example, the authentication machine 150 may be operated by a civil or corporate authority that issues certified documents. The authentication machine 150 includes a central processing unit 151, input/output devices 152, a bus 154 and a network interface circuit 156. A memory 160 is connected to the bus 154. The memory 160 stores an authentication module 162 with instructions executed by processor 151. Module 162 receives a request from the network 106 (e.g., from machine 102) to authenticate a document. The module 162 obtains a network link to a placeholder container for a future cryptographic transaction. The network link is inserted into the document. A cryptographic operations is performed on the document to form a certified document. The cryptographic operation on the document is recorded in the distributed ledger.

A distributed ledger machine 170 is also connected to network 106. A single distributed ledger machine 170 is shown, but it should be appreciated that hundreds or thousands of such machines are used to implement a distributed ledger. The distributed ledger machine 170 includes a processor 171, input/output devices 172, a bus 174 and a network interface circuit 176. A memory 180 is connected to the bus 174. The memory stores a distributed ledger module with instructions executed by the processor 171 to implement operations disclosed herein. The distributed ledger module 182 records transactions associated with a certified document.

The system 100 also includes a message receiving client machine 190. The machine 190 includes a processor 191, input/output devices 192, a bus 194 and a network interface circuit 196. A memory 198 is connected to the bus 194. The memory 198 stores a receive client module 199 with instructions executed by processor 191 to confirm the authenticity of a certified document. The receive client module 199 receives a digitally certified document, performs a cryptographic function on it to obtain cryptographic results. The cryptographic results include a network link, which is utilized to access a transaction sequence in a distributed ledger. The module 199 confirms that there is a match between a cryptographic result in the transaction sequence and a cryptographic result in the cryptographic results obtained from performing the cryptographic function.

Figure 2:
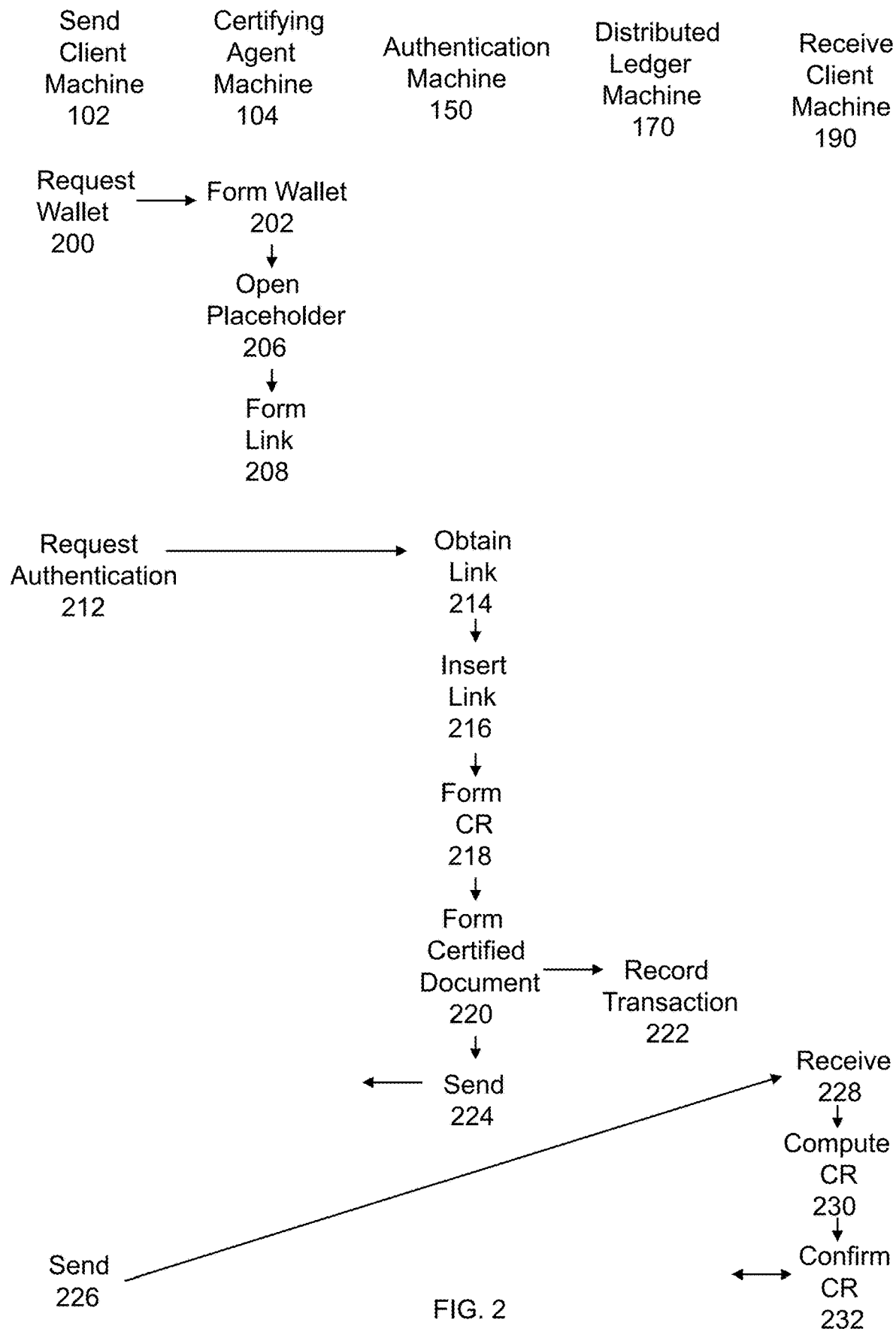
FIG. 2 illustrates processing operations associated with an embodiment of the invention.
Figure 3:
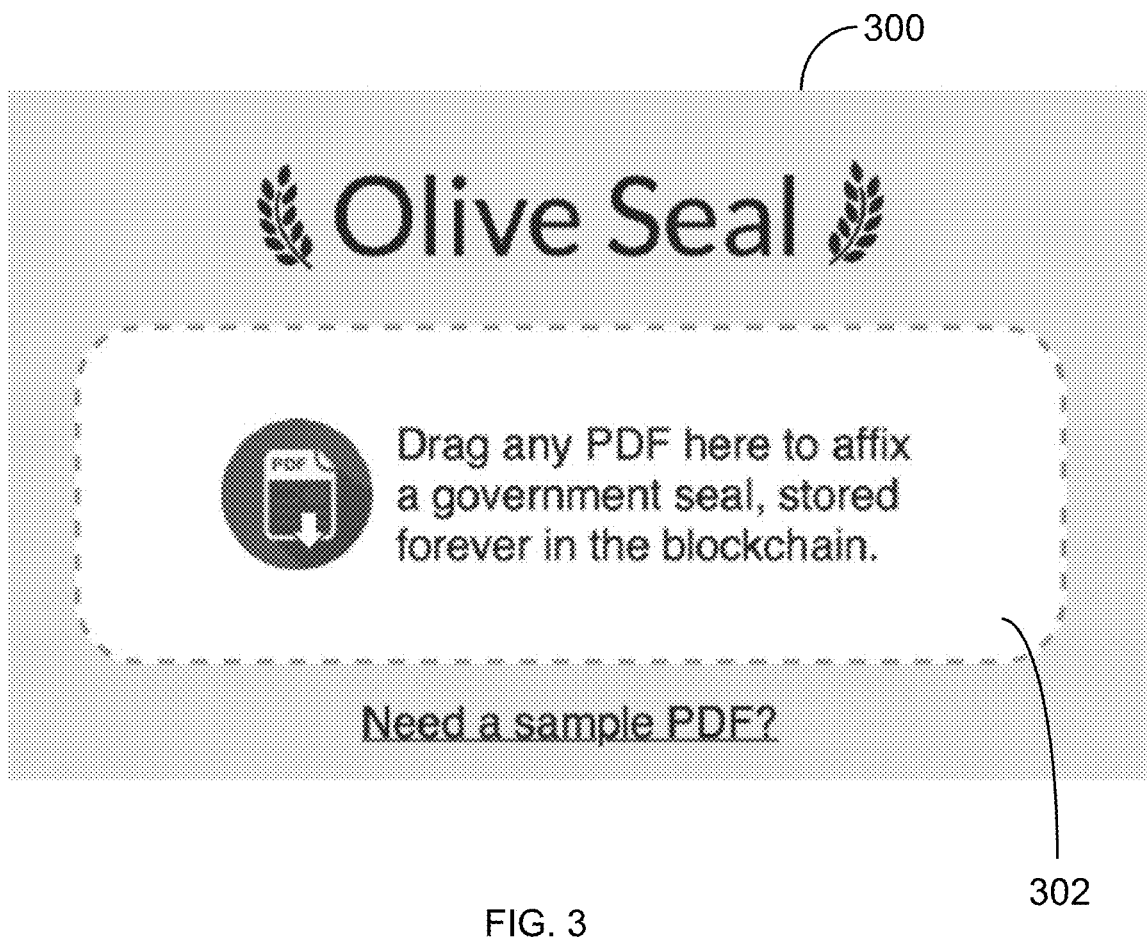
FIG. 3 illustrates a graphical user interface to initiate an operation of embedding a digital certification in a document.

The foregoing operations are more fully appreciated with reference to FIG. 2. FIG. 2 illustrates the machines of system 100 and the interactions between them. The message sending client machine 102 requests a wallet 200. The wallet may be a one-time-use wallet for certification of a document.

This request may go to a dedicated certifying agent machine 104. A wallet is formed 202 for a message sending client. A placeholder container is opened 206 in the wallet. The placeholder container is for a future cryptographic transaction to be recorded in the wallet. Observe here that this operation is like a cryptographic signature for a cryptographic operation (e.g., computing a hash) because only the certifying agency has access to the wallet. Therefore, verification of the authenticity of a message can be done by simply inspecting the distributed ledger and confirming that the sender of the cryptographic transaction corresponds to the public key of the message sender. This process materially simplifies the certification process for both the message sender and the message recipient, which would otherwise involve having to perform cryptographic functions using the sender's public key.

Next, a link is formed 208 to the placeholder container. The link is a network address to the placeholder container.

At this point, the user of the message sending client machine 102 has a wallet, which includes a placeholder container for a future cryptographic transaction to be recorded in the wallet. The future cryptographic transaction is authentication of a digital document. The message sending client machine 102 requests authentication of a document 212 by the authentication machine 150. By way of example, the authentication machine 150 may supply an interface 300, which invites a requester to drag and drop a document within an activation region 302.

A link for certification of the document is obtained 214. The request may include the network link to the placeholder container. Alternately, the requester name may be used to look up the wallet of the requester to obtain the network link. The link is inserted into the document 216. Cryptographic results are formed 218 from the combination of the document and the network link. This results in the formation of a certified document 220.

The authentication module 162 has a private key that may represent a civil or corporate authority that issues certified documents. A cryptographic operation (hash) is performed on the document to form a certified document. The authentication module 162 prepares a transaction from a wallet representing a certifying authority and the wallet referred to by the placeholder container. The hash is included in the transaction. The transaction is then signed with the private key and recorded in the distributed ledger 222.

Figure 4:
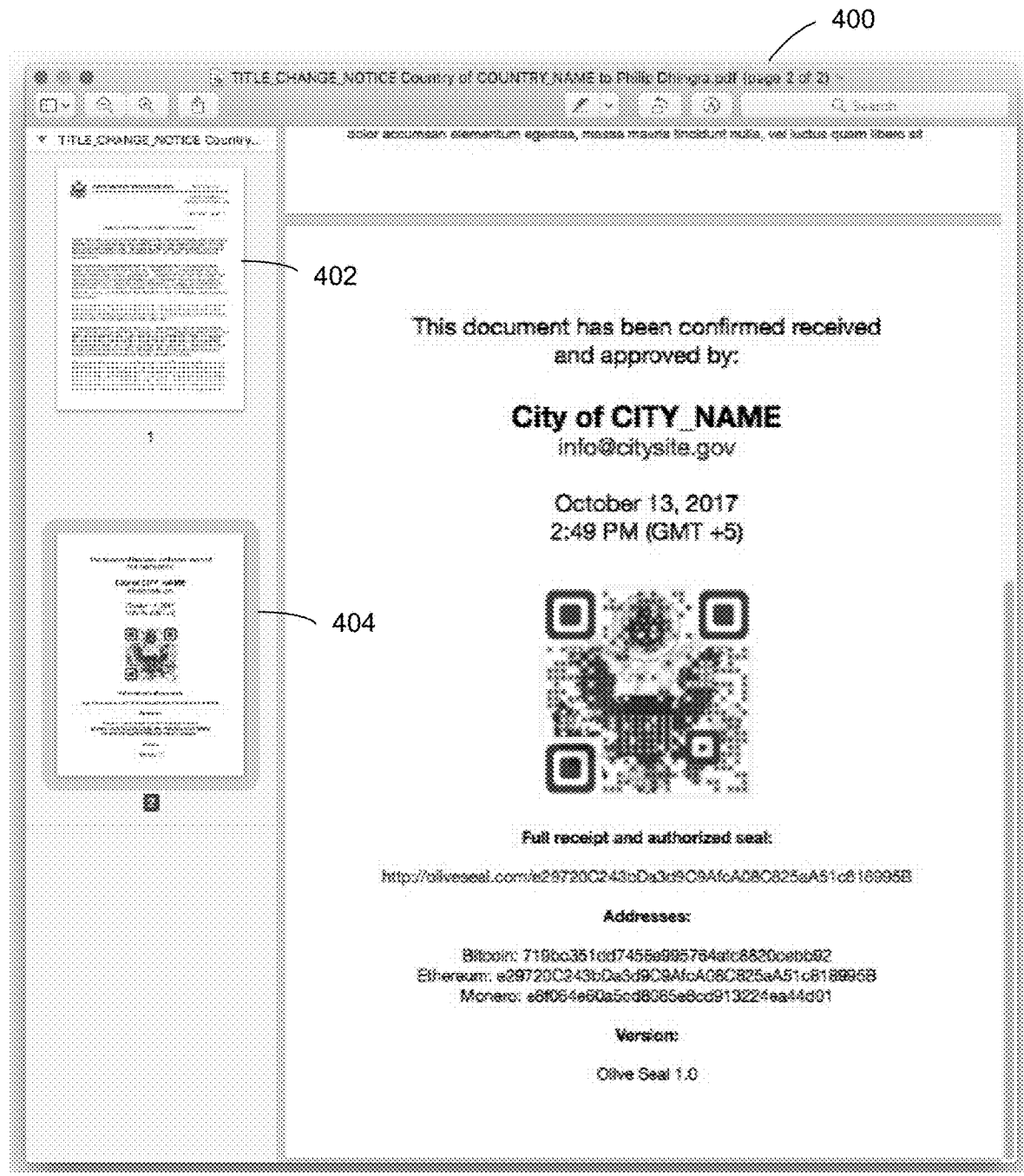
FIG. 4 illustrates a graphical user interface displaying an original document and an appended digital certification.

FIG. 4 illustrates an interface 400 displaying an original document 402 and a digital certification 404 attached to the original document 402. The digital certification 404 includes a digital stamp 406, which may an official seal, notary seal, QR code and the like. The digital certification 404 also includes a link 408 to the wallet in the distributed ledger that contains a cryptographic result for the document (e.g., a hash of the document). The transaction is recorded 222 in the distributed ledger, including distributed ledger machine 170. The document is also sent 224 to the client machine 102.

Figure 5:
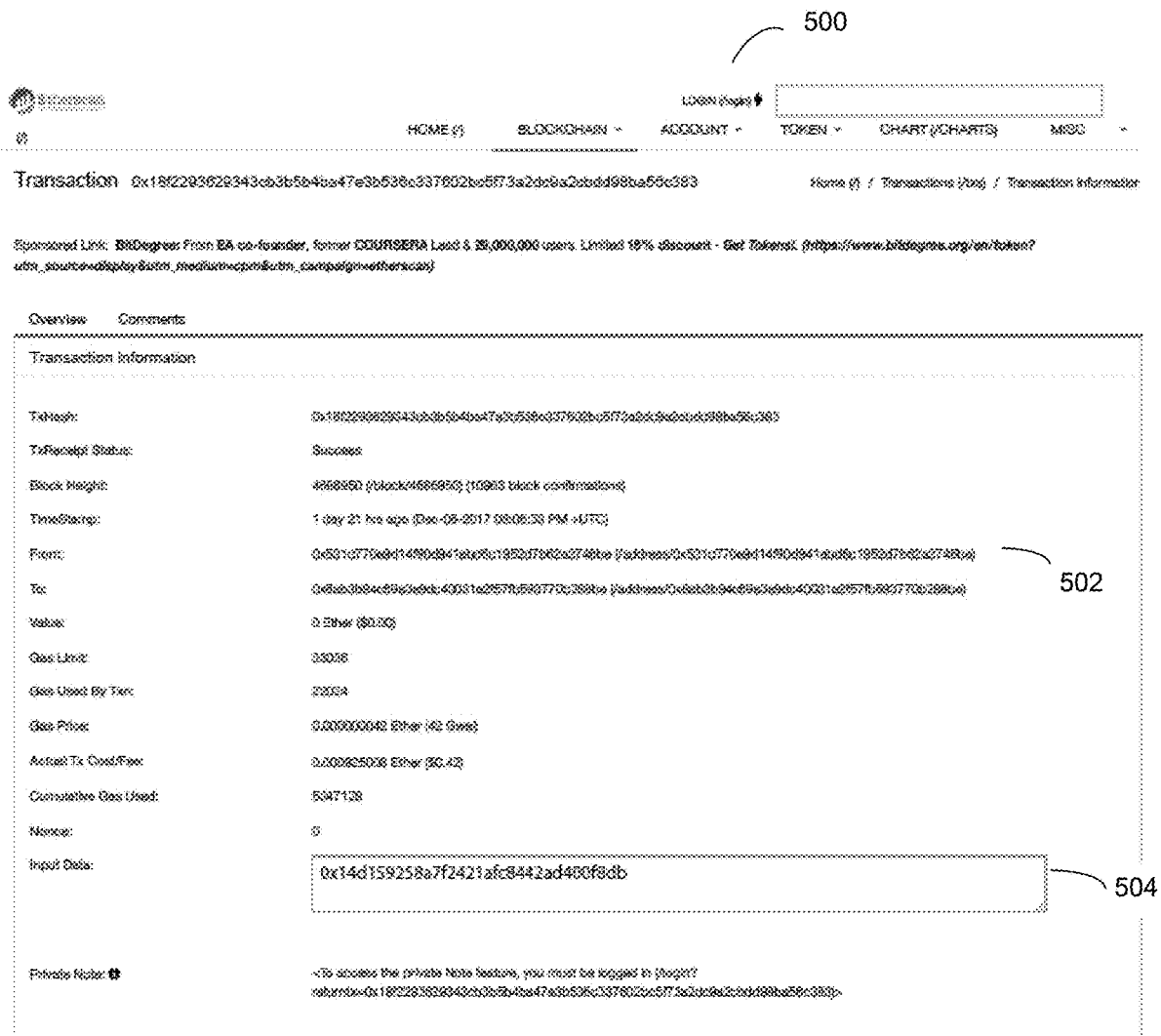
FIG. 5 illustrates a user interface to confirm a digital certification.

The client machine 102 may now send 226 the document to a recipient of choice. In this example, the certified document is sent to the receive client machine 190. The certified document is received 228. Cryptographic operations are performed on the certified document to obtain cryptographic results 230. FIG. 5 illustrates an interface 500 to display cryptographic results. The cryptographic results include a link 502 to the wallet of the certifying body (e.g., to the certifying agent module 142). The cryptographic results also include a cryptographic result 504, such as a hash of the document.

The cryptographic results are confirmed 232. The link 502 is used to show contents of transactions within the distributed ledger. The distributed ledger has a transaction sequence that includes a cryptographic result that should match the cryptographic result from computation 230.

The disclosed technology provides the cryptographic result (e.g., hash) and the original document as a single package without requiring recipients to install special software to view the certifying information. The placeholder container for the cryptographic result is created. Within the document a link to the container is included. A cryptographic result is then generated for the document, which includes the link. The cryptographic result is inserted into the container. The document can then be sent a recipient. It is possible to reverse the order of the last two steps (inserting the cryptographic result and sending the document).

In one implementation, the distributed ledger is the Ethereum® blockchain. As a container, an Ethereum® wallet is used. The cryptographic result may be stored as metadata in an empty transaction associated with a wallet owned by the certifying agency. In this way, one accomplishes the equivalent of a cryptographic signature for the cryptographic result, as only the certifying agency should have access to their wallet. In the document, there are hyperlinks to public Ethereum® browsers that show the contents of the Ethereum® transactions and thus reveal the cryptographic result for the document.

The specific type of container is irrelevant to solving the single-document requirement described above. However, using blockchain satisfies the two other technical requirements for certified documents, also mentioned above, which are to ensure the identity of the certifying party, and to ensure that the cryptographic result has not been altered.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hard-wired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A non-transitory computer readable storage medium storing instructions executed by a processor to:
   form a wallet for a message sending client, wherein the wallet is an online service that allows an individual to make electronic transactions that are recorded in a distributed ledger, wherein the electronic transactions are embedded digital certifications within documents,
   open a placeholder container for a future cryptographic transaction to be recorded in the wallet, wherein the future cryptographic transaction is an embedded digital certification within a document,
   form a network link to the placeholder container,
   receive a request to authenticate a document,
   obtain the network link to the placeholder container for the future cryptographic transaction,
   insert the network link into the document,
   perform a cryptographic operation on the combination of the document and the network link to form a certified document and a link to a wallet in the distributed ledger,
   record the cryptographic operation on the combination of the document and the network link in the distributed ledger,
   receive from the network the certified document,
   perform a cryptographic operation on the certified document to obtain certified document cryptographic results,
   select from the cryptographic results the link to the wallet in the distributed ledger,
   utilize the link to the wallet in the distributed ledger to show contents of transactions within the distributed ledger, and
   confirm that there is a match between the cryptographic result in the transactions within the distributed ledger and a cryptographic result in the certified document cryptographic results.

\* \* \* \* \*